US009307031B2

(12) United States Patent
Santhanam et al.

(10) Patent No.: US 9,307,031 B2
(45) Date of Patent: Apr. 5, 2016

(54) GENERIC MODEL FOR CUSTOMIZING PROTOCOL BEHAVIOR THROUGH JAVASCRIPT

(71) Applicant: Oracle International Corporation, Redwood Shores, CA (US)

(72) Inventors: Sathish Santhanam, San Francisco, CA (US); Terje Strand, Redwood Shores, CA (US); Xiaoman Xu, Beijing (CN); Yumin Sang, Beijing (CN); Boris Selitser, Castro Valley, CA (US); Honggang Frank Zhu, Roswell, GA (US); Karthic Loganathan, New Albany, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 267 days.

(21) Appl. No.: 14/069,297

(22) Filed: Oct. 31, 2013

(65) Prior Publication Data
US 2014/0223452 A1 Aug. 7, 2014

Related U.S. Application Data

(63) Continuation-in-part of application No. 13/758,768, filed on Feb. 4, 2013.

(51) Int. Cl.
*H04L 29/08* (2006.01)
*G06F 9/54* (2006.01)

(52) U.S. Cl.
CPC .............. *H04L 67/141* (2013.01); *G06F 9/541* (2013.01)

(58) Field of Classification Search
CPC ............................. H04L 67/141; G06F 9/541
See application file for complete search history.

(56) References Cited

U.S. PATENT DOCUMENTS 6,760,417 B1   7/2004   Wallenius
7,136,913 B2   11/2006  Linderman
(Continued)

FOREIGN PATENT DOCUMENTS

WO   2014007708   1/2014

OTHER PUBLICATIONS

Unknown Author, Oracle Communications Services Gatekeeper, Concepts and Architectural Overview, Release 4.1, Jan. 2009, pp. 1-1-A10.

(Continued)

*Primary Examiner* — Michael C Lai
(74) *Attorney, Agent, or Firm* — Tucker Ellis LLP

(57) ABSTRACT

The present invention provides a system and method for real-time communication signaling between HTML5 endpoints and between HTML5 endpoints and the IMS Core of a telecommunication network. In an embodiment the system includes a WebRTC Session Controller (WSC) communicating over an Internet domain protocol with a client-side controller. The client-side controller provides an extensible JavaScript API. The extensible JavaScript API encapsulates the signaling aspect of a communication session of the HTML5 application, including gathering media description, establishing signaling channels, and exchanging media descriptions with the WSC, populating the relevant WebRTC objects, managing the call after it has been established. The extensible JavaScript API which provides for extending the JavaScript API to facilitate development of new types of HTML5 applications without changing the code of the existing JavaScript API.

20 Claims, 8 Drawing Sheets

(56) References Cited

U.S. PATENT DOCUMENTS

| | | | |
|---|---|---|---|
| 7,483,438 | B2 | 1/2009 | Serghi |
| 7,716,240 | B2 | 5/2010 | Lim |
| 8,060,604 | B1 | 11/2011 | Breau |
| 8,185,548 | B2 | 5/2012 | Lim |
| 8,296,409 | B2 | 10/2012 | Banerjee |
| 8,630,299 | B1 | 1/2014 | Afshar |
| 9,038,082 | B2 | 5/2015 | Maes |
| 2002/0025795 | A1 | 2/2002 | Sharon |
| 2003/0028790 | A1 | 2/2003 | Bleumer |
| 2004/0009762 | A1 | 1/2004 | Bugiu |
| 2005/0245230 | A1 | 11/2005 | Benco |
| 2005/0262075 | A1 | 11/2005 | Beartusk |
| 2006/0248198 | A1 | 11/2006 | Galchev |
| 2007/0106801 | A1 | 5/2007 | Jansson |
| 2007/0143470 | A1 | 6/2007 | Sylvain |
| 2007/0156659 | A1 | 7/2007 | Lim |
| 2008/0103923 | A1 | 5/2008 | Rieck |
| 2008/0189421 | A1 | 8/2008 | Langen |
| 2008/0271113 | A1 | 10/2008 | Belling |
| 2009/0141704 | A1 | 6/2009 | Eng |
| 2009/0265607 | A1 | 10/2009 | Raz |
| 2009/0268715 | A1 | 10/2009 | Jansson |
| 2010/0114994 | A1 | 5/2010 | Huang |
| 2010/0142515 | A1 | 6/2010 | Jana |
| 2010/0183131 | A1 | 7/2010 | Chang |
| 2010/0223287 | A1 | 9/2010 | Lim |
| 2011/0072144 | A1 | 3/2011 | Fikouras |
| 2011/0082920 | A1 | 4/2011 | Bhattacharya |
| 2011/0107156 | A1 | 5/2011 | Miyata |
| 2011/0209181 | A1 | 8/2011 | Gupta |
| 2011/0258305 | A1 | 10/2011 | Chen |
| 2011/0258597 | A1 | 10/2011 | Chen |
| 2012/0016932 | A1* | 1/2012 | de Castro, Jr. ...... H04L 65/1043 709/203 |
| 2012/0045040 | A1 | 2/2012 | Maes |
| 2012/0072548 | A1 | 3/2012 | Kim |
| 2012/0144416 | A1 | 6/2012 | Wetzer |
| 2012/0178420 | A1 | 7/2012 | Ould |
| 2012/0233216 | A1 | 9/2012 | Lim |
| 2012/0317474 | A1* | 12/2012 | Parreira ............ G06F 17/30896 715/234 |
| 2013/0013804 | A1 | 1/2013 | Traynor |
| 2013/0042152 | A1 | 2/2013 | Fryc |
| 2013/0058262 | A1* | 3/2013 | Parreira ............ G06F 17/2247 370/276 |
| 2013/0067333 | A1 | 3/2013 | Brenneman |
| 2013/0073393 | A1 | 3/2013 | Nasr |
| 2013/0094445 | A1 | 4/2013 | De Foy |
| 2013/0097239 | A1 | 4/2013 | Brown |
| 2013/0104030 | A1 | 4/2013 | Parreira |
| 2013/0232217 | A1 | 9/2013 | Kristiansson |
| 2014/0007083 | A1 | 1/2014 | Baldwin |
| 2014/0026120 | A1 | 1/2014 | Gu |
| 2014/0040437 | A1 | 2/2014 | Mitsuya |
| 2014/0044123 | A1 | 2/2014 | Lawson |
| 2014/0075472 | A1 | 3/2014 | Mitsuya |
| 2014/0126714 | A1 | 5/2014 | Sayko |
| 2014/0156725 | A1 | 6/2014 | Mandyam |
| 2014/0181949 | A1 | 6/2014 | Hunter |
| 2014/0195588 | A1 | 7/2014 | Badge |
| 2014/0280522 | A1 | 9/2014 | Watte |
| 2015/0022619 | A1 | 1/2015 | Dinis Lopes |
| 2015/0195309 | A1 | 7/2015 | Opsenica |

OTHER PUBLICATIONS

Unknown Author, BEA WebLogic Network Gatekeeper, Architectural Overview, Version 3.0, Sep. 14, 2007, pp. i-C14.

Chen, et al., Applying SOA and Web 2.0 to Telecom: Legacy and IMS Next-Generation Architectures, 2008, pp. 374-379, IEEE International Conference on e-Business Engineering.

Ericson, et al., JSR 309 Overview of Media Server Control API, Version: Media Server Control API v1.0, Sep. 30, 2009, 87 pages, Hewlett-Packard Development Company, L.P.

Kulkarni, et al., SIP Servlet Specification, Version 1.1, JSR 289 Expert Group, Aug. 1, 2008, 240 pages, BEA Systems, Inc.

* cited by examiner

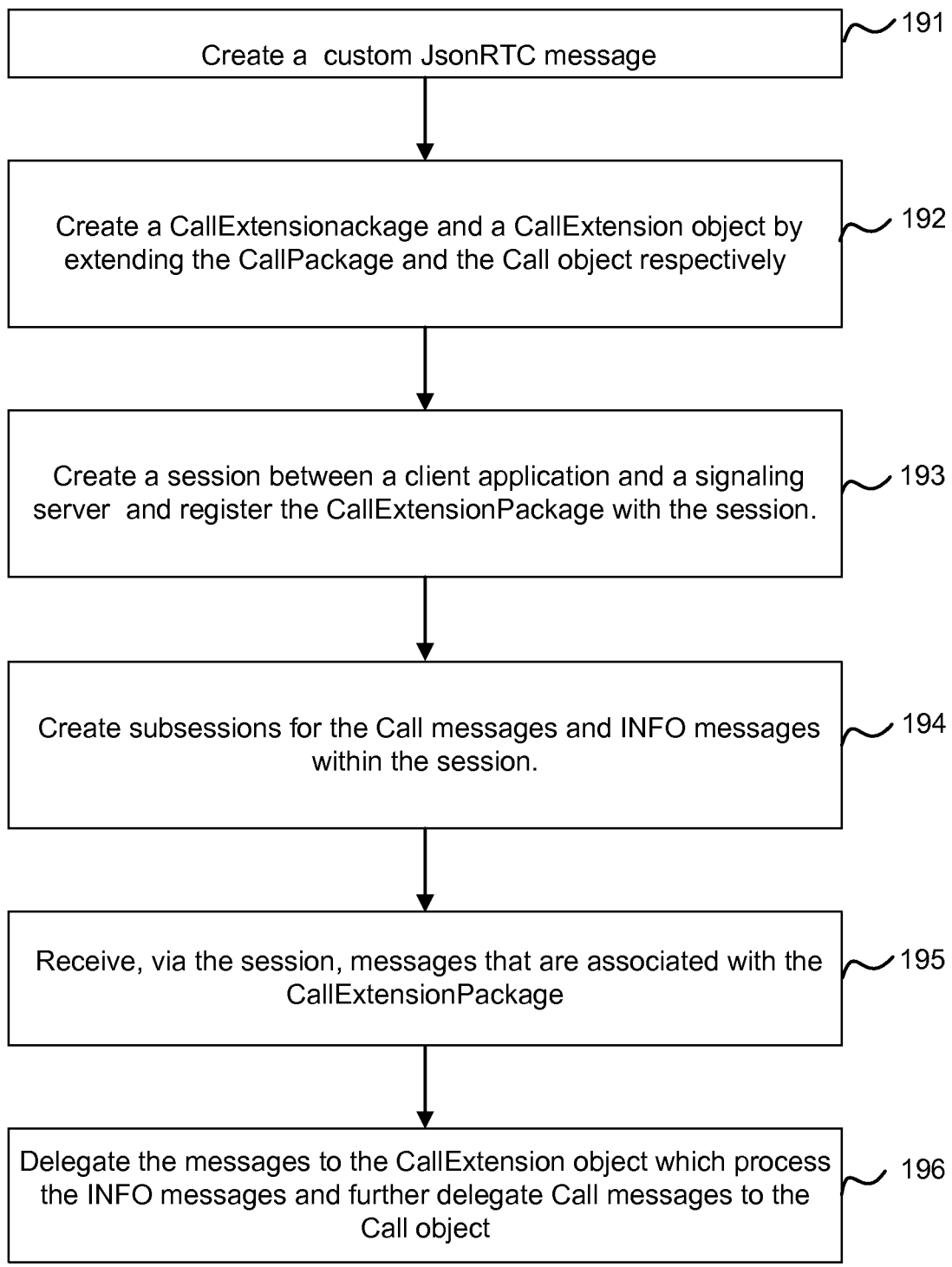

GENERIC MODEL FOR CUSTOMIZING PROTOCOL BEHAVIOR THROUGH JAVASCRIPT

CLAIM OF PRIORITY

This patent application is a continuation-in-part continuation of U.S. patent application Ser. No. 13/758,768, entitled "Real-Time Communication Signaling Gateway" filed Feb. 4, 2013 (Inventors: Honggang frank Zhu, Boris Selitser, and Karthic Loganathan), which application is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED CASES

This patent application is related to the following patent applications, which are hereby incorporated by reference in their entirety:
U.S. Patent Application titled "SYSTEM AND METHOD FOR EXTENDING IP MULTIMEDIA SUBSYSTEM TO HTML5 ENVIRONMENTS", application Ser. No. 14/069,214, filed Oct. 31, 2013;
U.S. Patent Application titled "JAVASCRIPT API FOR WEBRTC", application Ser. No. 14/069,236, filed Oct. 31, 2015;
U.S. Patent Application titled "INTEGRATED WEB-ENABLED SESSION BORDER CONTROLLER", application Ser. No. 14/069,246, filed Oct. 31, 2015;
U.S. Patent Application titled "BROWSER/HTML FRIENDLY PROTOCOL FOR REAL-TIME COMMUNICATION SIGNALING", application Ser. No. 14/069,308, filed Oct. 31, 2013; and
U.S. Patent Application titled "JAVA API FOR PROGRAMMING WEB REAL-TIME COMMUNICATION APPLICATIONS", application Ser. No. 14/069,263, filed Oct. 31, 2013.

FIELD OF THE INVENTION

The present invention relates to a system and method for real-time communication signaling in a telecommunications network, and more particularly to a method of enhancing an existing JavaScript API to develop new types of HTML5 applications by customizing the protocol behavior using JavaScript.

BACKGROUND

With the explosive proliferation of IP-enabled mobile and fixed devices capable of offering Web, telecom and entertainment services, such as 3G/4G-enabled smart phones, TVs, home appliances, gaming consoles, and automobiles, among others, operators of mobile, broadband and fixed networks are faced with the operational and business challenges of delivering innovative IP-based communication services with maximum profitability. In order to achieve this goal, customers are increasingly migrating away from expensive, closed, proprietary and application-specific legacy platforms, and towards low-cost, open, standards-based unified converged application platforms, which dramatically lower the time and cost of adding new features and extensions to existing IP-based communication services.

Session Initiation Protocol (SIP) is a control (signaling) protocol developed to manage interactive multimedia IP sessions including IP telephony, presence, and instant messaging. SIP is widely used in telecommunication networks. SIP and other communications centric protocols are complex, and their implementation requires significant domain expertise. However, SIP is not readily compatible with HTTP and use in the Internet domain.

The IP Multimedia Subsystem (IMS) is an architecture for an integrated network of telecommunications carriers that would facilitate the use of IP (Internet Protocol) for packet communications in all known forms over wireless or landline. Examples of such packet communications include traditional telephony, fax, e-mail, Voice over IP (VoIP), instant messaging (IM), videoconference sessions and video on demand (VoD). IMS uses a Voice-over-IP (VoIP) and runs over the standard Internet Protocol (IP). IMS gives network operators and service providers the ability to control and charge for each service. IMS architecture has the capability to support existing phone systems (both packet-switched and circuit-switched). Thus, IMS provides the interoperability, security, session management and QoS capabilities that telecommunications providers lack and desire. IMS is the de facto standard for next-generation networks.

HyperText Markup Language (HTML) is the main markup language for creating Web pages and other information that can be displayed in a Web browser. HTML is written in the form of HTML elements consisting of tags. HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages. The purpose of a web browser is to read HTML documents and compose them into visible or audible web pages. The HTML environment has a well known behavior according to standards established by the World Wide Web Consortium (W3C) which is the main international standards organization for the World Wide Web (abbreviated WWW or W3).

HTML5 introduced WebRTC application programming interfaces (APIs) that make it possible for applications that use JavaScript in an HTML5 environment to take part in real-time communications. To make use of this capability, applications that reside in the browser environment of one user need to exchange messages with another application to establish media connections. However, the signaling process of exchanging and negotiating session information is not specified by W3C and is left to the application to implement. After obtaining the local media streams, the applications therefore need to use their own logic to exchange the session description protocol (SDP) information between two HTML5 enabled environments. Once the SDP information is exchanged, the applications then use their own logic to pass each other media descriptions to the respective PeerConnection objects so that the media channel can be established. For non-media communication that does not need to use media channels, the application also requires custom logic. Accordingly when using the available WebRTC APIs, application developers are required to write significant boilerplate logic to establish and implement real time communication. The problem is more complicated if it is desired to make a connection with a non-browser media endpoint like a traditional telephony equipment.

It would be desirable to access the network services available in the IP Multimedia Subsystem (IMS) from the HTML environment, and in particular, the HTML environments capable of real-time communication, for example HTML5. However extending IMS architecture to the HTML environment is difficult owing to incompatibility of SIP with HTTP over TCP/IP and the requirement for domain expertise to overcome such incompatibility. There is presently no simple way to extend the network services of the IP Multimedia Subsystem (IMS) to HTML5 applications without radical changes to the IMS model and custom extensions to the HTML platform to permit a browser to be used as an endpoint for IMS services. Thus, despite the desire to extend the enhanced capabilities that IMS provides to the HTML environment, such integration has not been readily feasible.

It would therefore be desirable to provide a system and method for extending IMS architecture to the HTML environment which is effective and simple to implement.

It would further be desirable to provide a system and method for extending IMS architecture to the HTML environment without radical changes to the IMS model or custom extensions to the HTML platform.

It would further be desirable to provide a system and method for extending IMS architecture to the HTML environment which can be implemented without domain expertise.

It would further be desirable to provide extensible functionality to simplify implementation of the real-time communication in Web applications.

SUMMARY

The present invention provides a system and method for extending IMS architecture to the HTML environment which overcomes the limitations of the state of the art.

The present invention provides a system and method for extending IMS architecture to the HTML environment which is effective and simple to implement.

The present invention provides a system and method for extending IMS architecture to the HTML environment without radical changes to the IMS model or custom extensions to the HTML platform.

The present invention provides a system and method for extending IMS architecture to the HTML environment which can be implemented without domain expertise.

The present invention provides extensible functionality to simplify implementation of real-time communication is Web applications by providing an extensible JavaScript Application Programming Interface (API).

In an embodiment, the system and method of the present invention provide a communication channel between an HTML-capable application or operating system and the IMS core of a telecommunications network. The system and method overcome the need for domain expertise of complex SIP and other communications centric protocols. The system and method provide a mechanism to combine complex signaling in the IMS telecommunications network into simple operations towards the Web. The present invention thereby provides a platform which enables telecommunications providers to provide a better end-to-end customer experience accessible from a wide variety of HTML-capable consumer devices.

In an embodiment, the system and method of the present invention comprise a client-side controller, a WebRTC Session Controller (e.g., Oracle™ Communications WebRTC Session Controller), and a communications protocol for communicating between the client-side controller and the WebRTC Session Controller (WSC). The client-side controller provides client-side, native operating system application programming interfaces (API) and an extensible JavaScript API to interface with the HTML-capable application or operating system and encapsulate the HTTP signaling layer. The WSC terminates the communications with the client-side, and parses and normalizes the communications into an internal protocol suitable for communication with IMS within legacy telecommunications network systems (for example XMPP, SIP, and the like). The communications protocol provides a communication channel which is compatible with transmission over the Internet domain. The system and method thereby provides a dedicated "signaling" channel for all the applications on the client to interact with the IMS of telecommunications network services.

The JavaScript API for WebRTC signaling enables HTML5 applications to exchange signaling messages with a WebRTC Session Controller. These messages include attributes specific to the client application, where the client application could be a Call, a MessageAlert, or a Conferencing etc. The JavaScript API provides methods to handle various client application requirements like making a call or subscribing to message alerts etc. Typically an API provides methods specific to the client applications that the customers are expected to deploy. The problem with exposing application specific API is that if the customer wants to add a new kind of application, then the API needs to be enhanced to support this new application.

However, embodiments of the present invention provide an extensible JavaScript API for WebRTC signaling, which provides for extending a JavaScript API for developing new types of HTML5 applications without changing the code of the existing JavaScript API. In an embodiment of the invention, the JavaScript API can establish a session layer with a signaling server between the HTML5 application and a signaling server, and the HTML5 application can register itself with the session layer as a handler for application-specific messages from the signaling server.

In an embodiment of the present invention, the JavaScript API provides a mechanism that allows the HTML5 application to add customized information to the extension headers of signaling messages as defined by as defined by a proprietary JSON-based protocol. Both the signaling server and the HTML5 applications contain logic to process the customized information and act accordingly. In an embodiment of the invention, the existing JavaScript API can also be extended by creating a customized JSON-RTC protocol message to customize behaviors of HTML5 applications. In an embodiment of the invention, new JavaScript objects can also be created and registered with a session layer and start to send and receive messages to the WSC.

Other objects and advantages of the present invention will become apparent to those skilled in the art from the following detailed description of the various embodiments, when read in light of the accompanying drawings.

BRIEF DESCRIPTION OF THE DRAWINGS

FIG. 1D shows a flowchart of extending a JavaScript API in accordance with an embodiment of the invention.

DETAILED DESCRIPTION

Figure 1A:
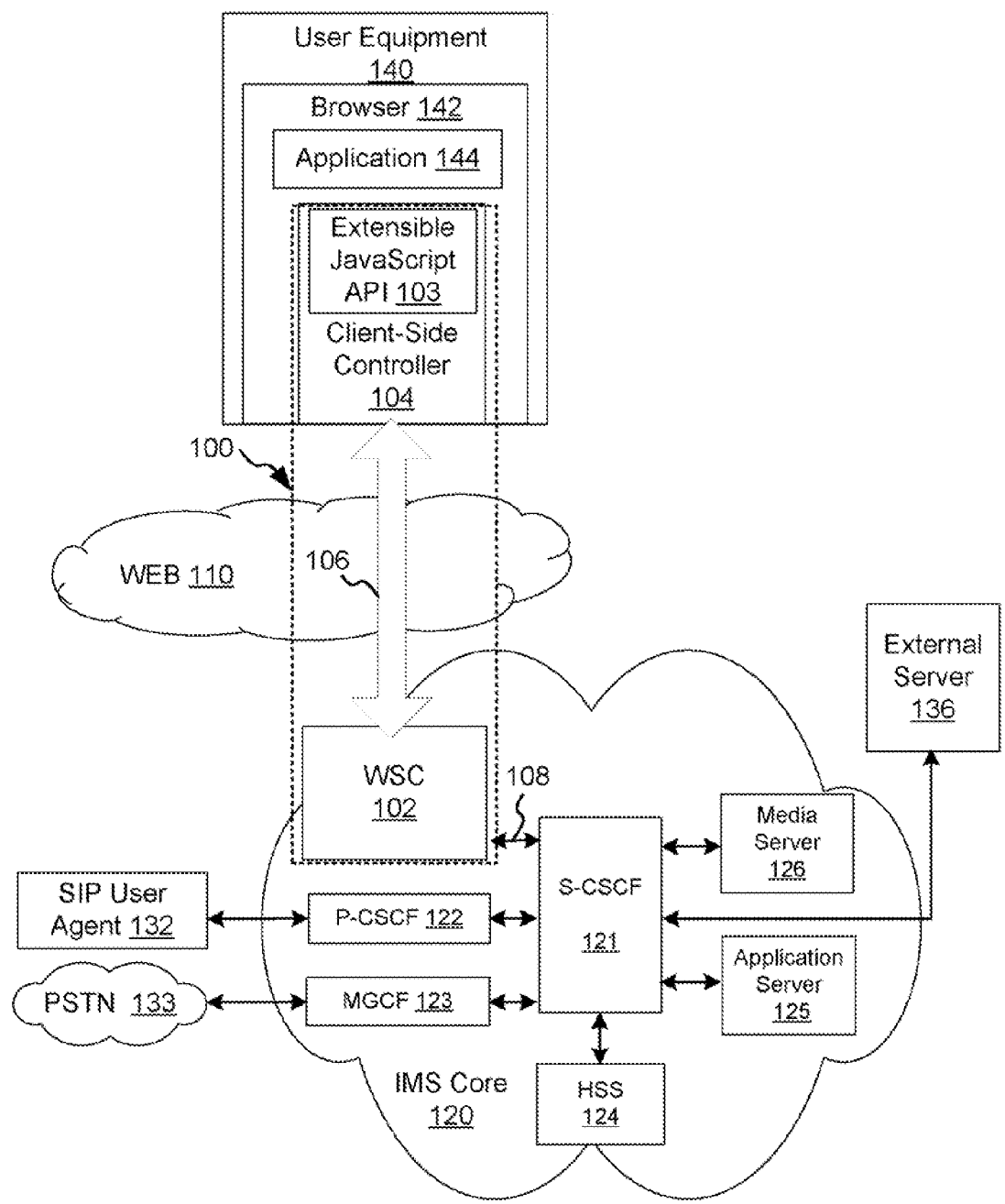
FIG. 1A shows an overview of a system for extending IP Multimedia Subsystem to HTML environments according to an embodiment of the present invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

FIG. 1A shows an overview of a system and method for extending IP Multimedia Subsystem to HTML environments according to an embodiment of the present invention. As shown in FIG. 1A, the system and method of the present invention 100, comprises a client-side controller 104, a WebRTC Session Controller (WSC) 102, and a communications protocol 106 for communicating between the client-side controller 104 and the WSC 102. The client-side controller 104, operating on User equipment 140, provides client-side, native operating system application programming interfaces (API) and a JavaScript API 103 to encapsulate the HTTP signaling layer. JavaScript API 103 is operative to encapsulate the signaling layer to facilitate development and implementation of Web Application 144. The WSC 102 terminates the Internet domain communications with the client-side, and parses and normalizes the Internet domain communications into an internal protocol 108 suitable for communicating with elements of the IMS Core 120 within legacy telecommunications network systems (for example XMPP, SIP, and the like). The communications protocol 106 provides a communication channel which is compatible with communications over the Internet domain 110. The system and method thereby provides a dedicated "signaling" channel for the HTML-capable applications/operating system on the User Equipment 140 to interact with the IMS Core 120 of the telecommunications network.

JavaScript API 103 enables an HTML5 application 144 to create a Session object as a browser side representation of the communication. From the Session object, the HTML5 application 144 can create different communication objects like Call, Subscription etc, and listen on the callbacks of the objects to receive incoming calls, notifications, media of the calls, and state changes etc. The JavaScript API 103 can encapsulate the signaling aspect of a communication session between HTML5 applications 144, including gathering media description, establishing signaling channels, and exchanging media descriptions with the WSC, populating the relevant WebRTC objects, managing the call after it has been established. The JavaScript API 103 also includes objects that can establish data channels for non-media data transfer and transfer the non-media data. The JavaScript API 103 can also handle reliability issues such as reliable message delivery and session resynchronization on a failure, as well as browser incompatibility. Thus, with the JavaScript API 103, the development of an HTML5 application 144 can be reduced to implementation of the business logic without writing boilerplate code thereby simplifying development and implementation of real-time communication in Web applications 144.

The JavaScript API 103 and protocol 106 provide extensibility mechanisms that allow the HTML5 application to add customized information to the extension headers of signaling messages as defined by as defined by a proprietary JSON-based protocol. Both the WSC and the HTML5 applications contain logic to process the customized information and act accordingly. In an embodiment of the invention, the existing JavaScript API can also be extended by creating a customized JSONrtc protocol message to customize behaviors of HTML5 applications. In an embodiment of the invention, new JavaScript objects can also be created and registered with a session layer and start to send and receive messages to the WSC.

The advantage of the extensible JavaScript API solution is that the JavaScript library supports the extensibility requirement that a customer typically needs. This means that the JavaScript library need not be updated or customized when there is a new kind of application comes in to play, which results in increased productivity for service providers. This extensibility mechanism gives the power to the customers to add creative/innovative applications (that uses JSONrtc protocol) with a short time to market and less cost of development. This provides a competitive advantage for service providers as alternative solutions may require application specific development and therefore and need more time to adapt to any new application types that the customer may come up with in the future.

Figure 1B:
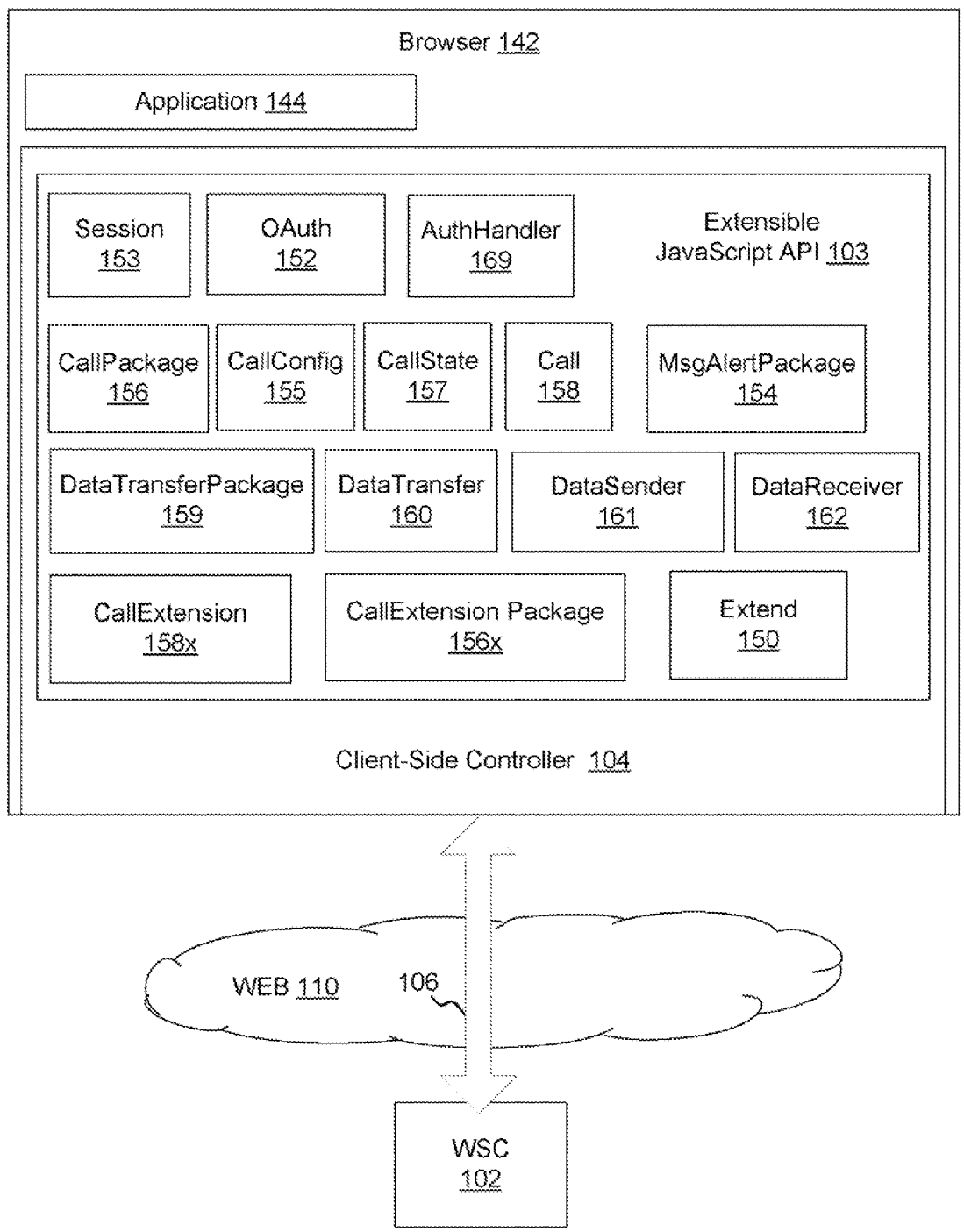
FIG. 1B shows aspects of a JavaScript API according to an embodiment of the present invention.
Figure 1C:
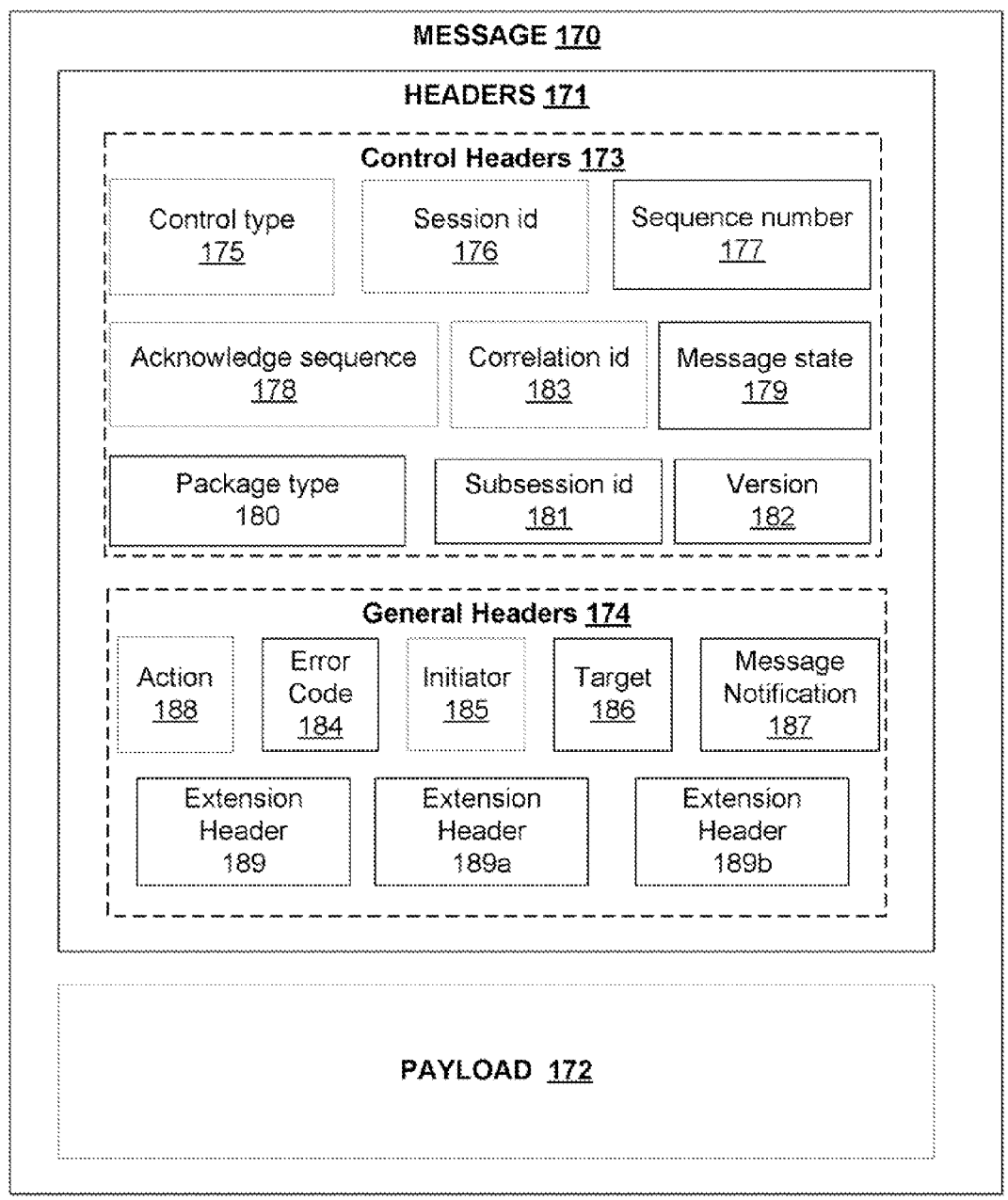
FIG. 1C shows aspects of an extensible JSONrtc protocol according to an embodiment of the invention.

In an embodiment of the invention, the JavaScript API can support three levels of extension: 1) Package extensibility; 2) Object extensibility; and 3) Message header extensibility. At the package level, application developers can create new packages implementing new functionalities, register the new packages with a JSON-RTC session layer created using the session of the JavaScript API, and start to send/receive application specific messages. At the object level, an existing object can be extended by using a programming design pattern. One example would be to create a new object by calling the constructor of the super class (the object to be extended), overwriting some methods inherited from the super class, and adding some new methods to the extending object (new object). At the header level, the client application can add extension headers to the JSONrtc message using the JavaScript API, which provides an extension message object that can be sent between the client application and the WSC. Transmitted messages then includes the extension header section, where additional information can be added. These additional headers are used on the server side to make routing decisions or implementing new functionalities, e.g. transferring a call or starting a chat session while the call is ongoing. Further details of JavaScript API 103 and JSON protocol 106 are shown in FIGS. 1B, 1C, and 1D described below.

User equipment 140 represents any HTML-capable device, including for example computing devices such as personal computers, laptops, desktops, notebooks, netbooks, tablets, mobile phones, and e-book readers. Moreover, HTML capabilities are being added to consumer devices, such as appliances, automobiles, set-top boxes, amplifiers, audio-visual components, televisions, projectors, and the like. HTML capabilities may be provided by a browser, for example, Safari, Firefox, Chrome Browser, and Internet Explorer. Alternatively, HTML capabilities may be a core component of the operating system, for example Chrome OS.

IMS Core 120 (IP Multimedia Subsystem or IP Multimedia Core Network Subsystem) is an architectural framework for delivering IP multimedia services. As shown in FIG. 1A IMS Core 120 comprises: S-CSCF 121; P-CSCF 122; gateway controller function (MGCF) 123; HSS 124; Application Server 125; and Media Server 126. These elements are shown as an example of conventional IMS architecture. IMS Core 120 may contain additional and/or different elements depending upon the implementation of a particular network. The present invention is not limited to any particular implementation of IMS Core 120. Indeed, it is a feature of the present invention that it extends whatever features are present in IMS Core to the Internet domain.

To ease the integration with the Internet, IMS uses IETF protocols wherever possible, e.g., Session Initiation Protocol (SIP). IMS Core 120 includes network elements designed to interact with SIP User Agents 132 and PSTN 133. As used herein, a user agent is an SIP endpoint that can be considered anything that either originates or terminates a SIP session, e.g., SIP Phones, Soft Phones, and the like. Typically such devices must be specifically designed to implement SIP in order to function as SIP User Agents 132. In addition the IMS Core 120 can exchange signaling and media messages with a public switched telephone network (PSTN) 133. IMS Core 120 facilitates access to multimedia and voice applications from wireless and wireline terminals to create a form of fixed-mobile convergence (FMC). This is done by having a horizontal control layer that isolates the access network from the service layer. From a logical architecture perspective, services need not have their own control functions, as the control layer is a common horizontal layer.

Referring again to the IMS Core 120 shown in FIG. 1A, P-CSCF 122 represents the proxy call session control function which is an entry point for a SIP user agent 132, and authenticates users and establishes IP security integration with the SIP user agent 132. Media gateway controller function (MGCF) 123 is the entry point for signaling and media messages transmitted via public switched telephone network (PSTN) 133. MGCF 123 and P-CSCF 122 are used to process ingoing and outgoing SIP signaling packets in the IMS Core 120. On the network side, MGCF 123 and P-CSCF 122 interact with S-CSCF 121 using Session Initiation Protocol (SIP).

S-CSCF 121 is the central node of the signaling plane. It is a SIP server, but also performs session control. S-CSCF 121 is located in the home network. It uses Diameter Cx and Dx interfaces to the Home Subscriber Server (HSS) 124 to download user profiles and upload user-to-S-CSCF associations. All necessary subscriber profile information is loaded from the HSS 124. S-CSCF 121 inspects every message from the SIP user agent 132 and/or other network elements, and decides where the SIP message should be forwarded for service provision. An Application Server AS 125 hosts and executes services, and interfaces with the S-CSCF 121 using SIP. Additionally a media server 126 provides media related functions such as media manipulation, e.g. voice stream mixing and interfaces with the S-CSCF 121 using SIP. S S-CSCF 121 may also allow for provisioning of services and/or media services from an external server 136.

As described above, the elements of IMS Core 120 communicate with the central node of the signaling plane S-CSCF 121 using Session Initiation Protocol (SIP) (alternative session oriented protocols may also be used, including for example XMPP). However SIP is not easily compatible with conventional protocols for transmission over the Web 110. Integration of IMS Core 120 is therefore difficult owing to incompatibility of protocols used in the two different environments and the requirement for domain expertise to overcome such incompatibility. The present invention provides a solution to such problems and therefore allows for extending the IMS Core 120 to the Web 110.

WSC 102 is an entry point for HTTP traffic from Web 110. WSC 102 terminates Internet domain communications with the client-side, and parses and normalizes the Internet domain communications into an internal protocol 108 suitable for communicating with elements of the IMS Core 120 (e.g. S-CSCF 121) within legacy telecommunications network systems (for example XMPP, SIP, and the like). WSC 102 communicates with client-side controller using a protocol 106 adapted to meet the real-time signally requirements of SIP while remaining compatible with transmission over Web 110. The client-side controller 104 operating on User equipment 140 provides client-side, native operating system application programming interfaces (API) and JavaScript API 103 to interface with HTML-capable applications/operating systems and encapsulate the HTTP signaling layer. The system and method 100 thereby provides a dedicated "signaling" channel for all the HTML-capable applications/OS on the User Equipment 140 to interact with the IMS Core 120 of the telecommunications network.

From an IMS network perspective, WSC 102 sits in the edge of IMS core 120 and is architecturally parallel to a P-CSCF. While P-CSCF is the entry point (many times along with a Session Border Controller) for the SIP endpoints, WSC 102 serves as the entry point for HTML5 endpoints. Thus, WSC 102 has the ability to leverage applications in the IMS application server 125 instead of hosting a separate/custom business application on its own thus greatly simplifying integration with IMS Core 120. For example, for a conference server, the WSC 102 would intelligently hand the requests to a backend IMS application server 125. The conference application would then route the requests to an appropriate media mixer and run the conference.

FIG. 1B shows aspects of JavaScript API 103 of FIG. 1A according to an embodiment of the invention. The JavaScript API 103 includes a plurality of function/objects that handle the signaling aspect of peer-to-peer media communications via a centralized server, e.g., WSC 102, and additionally can enable a data channel for peer to peer data transfer. The various functions/objects 152-169 of the JavaScript API 103 can provide functionality to support real-time communication by HTML5 application 144. Using JavaScript API 103, HTML5 application 144 can create a session object, which can establish a reliable session with the WSC 102. In an embodiment of the present invention JavaScript API 103 is extensible in order to provide for extending JavaScript API 103 for developing new types of HTML5 applications without changing the code of the existing JavaScript API 103.

The session object acts as the browser-side representation of the communication session. Session can also be used by the HTML5 application 144 as a basis for creating other objects to support the establishment of a media call. From session, the application can create different communication objects like call, subscription etc. All these objects support an asynchronous programming model, using callback functions. The HTML5 application 144 can listen on the callbacks to receive incoming calls, notifications, media in the call, and state changes etc. In addition, the session object can encapsulate the connectivity to the WSC 102, and hide the complexity about reconnect from the user/developer. In an embodiment of the invention, the HTML5 application 144 can create only one session towards the WSC 102 for each user identity, and a plurality of sub-sessions within the session.

The following example pseudo code, illustrate the process of creating a call using the JavaScript API 103. Out the outset, application 144 utilizes Session 153 to create a session object by specifying the identity of the user and the WebSocket URL. When the WebSocket session is established, an appropriate callback function is invoked so that the call can be started.

```
1. Create a Session object:
    var wseSession
    callPackage
    wseSession = new wse.Session(userId, wsUri, onSuccess, onFailure).
2. Create an AuthHandler object for the wseSession object and define the
"refresh" callback function for the AuthHandler object:
    var authHandler = new wse.AuthHandler(wseSession)
    authHandler.refresh = authCallbackFunc.
3. In the onSuccess callback, create a CallPackage object:
    onSuccess( ) {
    //save the session ID to HTML5 storage if needed
    callPackage = new wse.CallPackage(wseSession)
    //register callbacks for incoming calls and rehydrated calls
    callPackage.onIncomingCall = handleIncomingCall
    callPackage.onResurrect = handleRehydratedCall.
4. Create a CallConfig object and create a Call object:
    var callConfig = new wse.CallConfig
(wse.MEDIADIRECTION.SENDRECV
    wse.MEDIADIRECTION.NONE)
    var call = callPackage.createCall(callee, callConfig, onError)
    //register callbacks for call state and media state changes
    call.onCallStateChange = handleCallStateChange.
5. Start the Call:
    call.start( ).
    6. End the call:
    call.end( ).
```

After a session is created, the HTML5 application 144 can invoke AuthHandler 169 to create an AuthHandler object registered to the session. AuthHandler 169 can get authentication information from the HTML5 application 144, return service authentication information or TURN server authentication information based on the parameter "authType". The HTML5 application 144 may need to provide authentication information when the WSC 102 cannot meet an authentication challenge for a request from the HTML5 application 144. When the request is sent to the WSC 102, the request can get an authentication challenge response, e.g., 401 (unauthorized)/407 (proxy authentication required). If the WSC 102 by itself cannot provide authentication information to meet the challenge, the WSC 102 can forward the authentication challenge 401/407 to the HTML5 application 144 and call AuthHandler 169 to get the authentication information from the HTML5 application.

On any incoming message from the WSC 102, the session created using the Session object 153 can determine the package handler for the message based on the package name contained in the message, and delegate the message to the appropriate package handler for processing the message. A package handler is created from an object specific to the package type, e.g., CallPackage 156, DataTransferPackage 159, and MessageAlertPackage 154. The package handlers can use the session to create a new subsession and use the subsession to exchange messages with the WSC 102. For example, the CallPackage 156 can create a new subsession for each new Call. All the messages that belong to a particular call use the same subsession ID. Session 153 can store key values for each package and provide an API to get/set these values. The packages can use this API to store/fetch the necessary data from the session object.

The CallPackage object 156 can encapsulate call associated operations, and provide utility functions that be used for setting up the call. In addition, the CallPackage object 156 can be used to create the Call object 158 as follows:

```
wseSession = new wse.Session(userIdentity, wsUri, onSessionSuccess,
onSessionError, sessionConfig);
callHandler = new wse.CallPackage(wseSession);
var call = callHandler.createCall(callee, callConfig, onCallError).
```

In an embodiment of the invention, the Call object 158 can be configured using the CallConfig object 155, which can set the direction of the media call, e.g., receive, send, or received and send.

A number of callback functions can be set by the HTML5 application on the Call object 158. For example, some callback functions can be set on the Call object to notify the HTML5 application 144 of the state changes to the call, and the HTML5 can use the state changes to modify the Web user interface. For example, the onCallStateChange( ) callback function can be invoked whenever the state of the call is changed by the other party via signaling. This can include re-starting the call, disconnecting the call etc. The onCallStateChange( ) callback takes a CallState object 157 as a parameter. The onMediaStatechange( ) callback function on the Call object 158 can be used to notify the HTML5 application of changes to a media state, e.g., change to the SDP information on either the local side or the remote side. The notification provides the HTML5 application 144 with an opportunity to modify the SDP using the API provided by the Session object 153 pro-actively before applying the SDP to the browser 103.

A DataTransferPackage 159 can enable data channel connection, and manage the DataTransfer object 160 to create a data channel and expose the data channel capability to the HTML5 application 144. The DataTransfer object 159 can also be used to create a DataSender object 161 and DataReceiver 162 (via calling getReceiver ( ) and getSender( ) method respectively) to transfer and receive raw data through the data channel set up by the DataTransfer object 160.

The JavaScript API 103 also includes objects that manages subscriptions, including creating new subscriptions, managing existing active subscriptions, and delivering the received messages to a corresponding subscription object to process them. In an embodiment of the invention, the JavaScript API 103 includes an OAuth object 152 that handles Facebook authentication/login process.

The JavaScript API 103 can be downloaded to the client browser 103 as part of a client software development kit (SDK), which can provide functionalities for the JavaScript API 103 to handle reliability issues such as reliable message delivery and session resynchronization. In an embodiment of the invention, the client SDK stores the client side session data to the local session storage of the browser 103. After a browser reloads, if the HTML5 application 144 has saved the session Id, the client SDK can create a session using the saved session Id, rehydrate the session using the data stored in the session storage, and send a data re-connect frame to the WSC 102 server. If the re-connect succeeds, the client SDK can call the onRehydration( ) method of each package to create related objects.

For example, the SDK can call the onRehydration method of the CallPackage 156 with call data from the session storage to create an instance of the Call object 158, and then call the onRehydratedCall( ) method of a call handler created from the CallPackage 156 to notify the HTML5 application 144 that the call has been rehydrated. The HTML5 application 144 can call the resume( ) method on the Call object instance to continue the call.

Extensibility

In accordance with an embodiment of this invention, a mechanism is provided such that any new kind of application can be enabled without the requirement of changing the existing JavaScript API 103. In addition, this mechanism also provides ways to customize or override the default message handling behavior of the JavaScript API 103. The JSONrtc session layer is designed and implemented such that any new kind of application can register itself against the session layer and start using the session layer to send and receive application specific messages. The session layer implementation is independent of any particular application. The protocol 106 and API 103 are designed and implemented such that a developer can add additional header information in the JSONrtc messages (see FIG. 1C). These additional headers are used in the server side to make routing decisions etc. Where extension headers are included, the API 103 allows an application to intercept messages from the server and handle any special cases if the message warrants the same. If not, the message handling is delegated to the default package handling mechanism provided in the JavaScript API 103. The developer application can create customized JSONrtc protocol messages and send them to the WSC utilizing the established session. The customized message confirms to the standard message format, but, it can have application specific message attributes (see FIG. 1C).

As described above, the JavaScript API 103 can support three levels of extension: 1) Package extensibility; 2) Object extensibility; and 3) Message header extensibility. At the package level, application developers can create new packages implementing new functionalities, register the new packages with a JSON-RTC session layer created using the session of the JavaScript API, and start to send/receive application specific messages. The JavaScript API 103 allows the developer to create new package handlers or to extend existing package handlers. The following example illustrates use of the JavaScript API 103 to create a new package handler.

```
var NewDefinedPackage = function(session){
    //This is a required property for define a wse package handler
    this.packagename
    ="newdefinedsample";
    //Register the package handler in the session session.registerPackage
    (this);
};
NewDefined Package. prototype={
    //Handler the message received from wse server
    onMessage:function(message){...},
    //Release resource
    close:function( ){...}
};
var callHandler = new NewDefinedPackage(wseSession);
```

The following example illustrates use of the JavaScript API 103 to extend an existing package handler.

```
var CallPackageExtension = function(session){
    //sub-class must invoke the superclass's constructor
    CallPackageExtension.superclass.constructor.apply(this, arguments);
    session.registerPackage(this);
};
//Override some functions of parent object or add new functions.
wse.extend(CallPackageExtension,wse.CallPackage);
var extCallHandler = new CallPackageExtension(wseSession);
extCallHandler.start(callargs).
```

At the object level, an existing object can be extended by using a programming design pattern. One example would be to create a new object by calling the constructor of the super class (the object to be extended), overwriting some methods inherited from the super class, and adding some new methods to the extending object (new object). The JavaScript API 103 provides an Extend function 150 wse.extend(child,parent), that enables JavaScript object extension. The following example illustrates use of the Extend function 150 of JavaScript API 103 to extend an existing object.

```
function CallExtension( ){
    //chain constructors
    //In the below statement, 'arguments' is an implicit array of
    arguments passed to this function
    CallExtension.superclass.constructor.apply(this, arguments)
}
CallExtension.prototype.onMessage = function (message) {
    //check if this is an info message, if so, handle it here
    if (this.isInfoMessage(message)) {
    console.log("Got an INFO message...");
    //handle info message
    .....
    }else{
        //delegate the handling to the base class
        CallExtension.superclass.onMessage.call(this, message)
    }
};
CallExtension.prototypeisInfoMessage = function (message) {
    var action = message.getValue("header", "action"),
        type = message.getValue("control", "type");
    return action === "info" && type === "message";
};
wse.extend(CallExtension, wse.Call).
```

At the header level, the client application can add extension headers to the JSON-RTC message using the JavaScript API, which provides an extension message object that can be sent between the client application and the WSC. Transmitted messages then includes the extension header section, where additional information can be added. These additional headers are used on the server side to make routing decisions or implementing new functionalities, e.g. transferring a call or starting a chat session while the call is ongoing. The API make it is easy to add new a package handler or extend an existed package handler without affecting the existing package implementations.

The JavaScript API 103 provides a way to permit the developer to add developer-defined information into signaling messages as follows. First, in order to add customer defined information into the signal message from HTML5 browser 142 to WSC 102, the developer needs to pass a JSON object (extend information) to the JavaScript API 103 as the last parameter. For example, the "start" API only defines one parameter, as call.start(localMediaStreams). If the developer invokes the API as following, the "start" signal message will be added the extend information.

```
var extendheader ={'header',{key1:value1,key2:value}};
call.start(localMediaStreams,extendheader);
```

In response, if the API handler receives a signal message containing some information beyond the protocol defined content (e.g. the extendheader parameter), the extended information will be packaged as a JSON object and passed to the API user's callback function as the last parameter. Thereby allowing use of the extended parameter by the developer.

FIG. 1C shows a diagram representing a message implementing the protocol 106 component of the system for extending IP Multimedia Subsystem to HTML environments of FIG. 1A. According to an embodiment of the invention, protocol 106 defines an extensible data exchange format for communication between and HTML5 Application and a server or other HTML5 endpoints. At a top level, data format defines a set of control headers, a set of general headers and a payload. The headers allow for extension as previously described. The control headers primarily relate to operation of the communication channel whereas the general headers relate to the communication. In communication with a WSC, the control headers are primarily useful to actions of the WSC itself whereas the general headers are useful for conversion to a downstream protocol e.g. SIP. The two layers of headers thereby simplify communication with the WSC as well as simplifying implementation by a web developer. Note that, as previously described, the protocol permits for the creation of one or additional extension headers to implement new functionality (shown in FIG. 1C as extension headers 189, 189a, 189b).

The protocol and message format are friendly for conversion to other protocols used by non-HTML5 environments, thus enabling the WSC 102 to mediate between an HTML5 application (e.g. Browser 142) and a non-HTML5 endpoint, e.g., traditional telephony equipment (IMS Core 120). Thus, the WSC 102 can receive a JSON message in the protocol 106, parse the SDP information and map it to other protocols 108 (SIP/XMPP) supported by the IMS Core 120 of traditional telephony equipment. The WSC 102 can maintain a data definition for the format to parse to.

As illustrated in FIG. 1B, a frame or message 170 in the protocol 106 can contain a headers section 171 and a payload section 172. The headers section 171 includes a control headers section 173 and a general headers section 174. The message can include one or additional extension headers to implement new functionality (shown in FIG. 1C as extension headers 189, 189a, 189b).

The payload section 172 is specific to the package being used. A package is the type of service or functionality that the message handles. The defined packages for this protocol are call, presence and message notification. For example, the payload for the call package will be an SDP (offer or answer), and the payload for the message notification package can be a JSON data with exact message alerts. Similarly a presence package would expect the payload to be the presence information.

The control headers section 173 contains the information related to the semantics of the protocol, e.g., information required for WebSocket re-connect, reliability, timeouts, error etc. It also contains the state of the message, type of the message etc. In an embodiment of the invention, the control headers section 173 can include the following fields: control type 175, session Id 176, sequence number 177, acknowledge sequence 178, message state 179, a package type 180, a subsession Id 181, version 182, and correlation id 183. The fields comprise attribute-value pairs information related to the semantics of the protocol. TABLE I shows the control headers 173 of the protocol.

TABLE I

| Attribute | Value | Function |
| --- | --- | --- |
| Type (t) | | Control type of the JSON message. Three control types (r, rs and m) may have a payload, whereas the others (a and e) do not. |
| Type (t) | Request (r) | A message that require a response. An example is an offer message. |
| Type (t) | Response (rs) | A response to a request. Example, Answer. |
| Type (t) | Message (m) | A message that does not require a response. Example, Notification, publish etc. |
| Type (t) | Acknowledge (a) | An acknowledgement of a message. |
| Type (t) | Error (e): | A message indicating an error in one of the messages the other party sent. |
| package_type (p) | "call" "presence" "message_notification" | The package is the type of service or functionality, that the message handles. If no package is specified, "call" package is assumed for all messages except CONNECT action. |
| session_id (sid) | Session identifier. | Uniquely identifies a WebSocket session, that the client establishes with the server. |
| subsession_id (ssid) | | Identifies a particular subsession within the session. |
| correlation_id (ci) | | Associates the current message with a prior message. E.g. a response with a request. |
| Sequence (s) | Sequence number is a serial number that starts with 1. | Sequence number uniquely identifies a message within the session. Each side of the WebSocket connection uses their own series of numbers. |
| ack_sequence (as) | Serial number. | Optional. ack_sequence identifies a particular message within a session. This header can appear in both client and sever messages. It is used to confirm receipt of the identified message. |

TABLE I-continued

| Attribute | Value | Function |
|---|---|---|
| message_state (ms) | "Subsequent" "Final" | Identifies whether the message is Initial, Subsequent or Final. An answer can be an initial answer, subsequent answer or a final answer. The state of "Initial" is implied for any message. When there is a subsequent or final message, the message_state is specified. |
| Version (v) | 1.0 | Indicate the protocol version client or server supports. The version of the protocol defined in this document is "1.0". In case version is absent, it is defaulted to be "1.0". |

The control type 175 defines the types of the message, which can be request, response, message acknowledgement, or error. A request control type indicates that the message requires a response, and a response control type indicates the message is a response to a request. In an embodiment of the invention, the control types of request, response and message can include a payload 172.

Requests, responses and messages can carry a payload between the client and a server. An advantage of messages is that they do not necessitate a response. The protocol has its own reliability model to ensure message delivery as explained below. Thus messages can be used to avoid request/response overhead. This simplifies coding of the communication for the Web developer because the developer does not need to code the request/response functionality but can instead rely on the reliability model to ensure message delivery.

In an embodiment of the invention, a message state field 179 specifies if a message is Initial, Subsequent or Final. For example, an answer can be an initial answer, subsequent answer, or a final answer. The state of "Initial" is implied for any message and the state for a subsequent or final message needs to be explicitly specified.

Package type 180 indicates the type of service or functionality that the message handles, e.g., call and presence. If no package type is specified, a call package is assumed for all messages except messages with a CONNECT action.

The protocol 106 provides for both a Session ID and a Subsession ID. Session ID 176 identifies a WebSocket session that the client establishes with the server. The Session ID is unique across time and space. This helps Session ID to remain unique across geographically redundant clusters and also withstand node/geography failures. A subsession ID 181 can be used to identify a particular subsession within a WebSocket session. In an embodiment of the invention, the Subsession ID is the sequence number 177 of the message that establishes the subsession, with a prefix "c" or "s" denoting the direction of the referenced message, where "c" indicates that the referenced message is originated from the client, and "s" indicates that the referenced message is originated from the server (WSC).

The protocol provides for a unique sequence number for each message of a session (WebSocket connection). The sequence number 177 is a serial message number that starts with 1 at the beginning of the session and increments with each message. Each side of the WebSocket connection has their own series of sequence numbers. A sequence number uniquely identifies each message within a session. An acknowledge sequence number 178 acknowledges receipt of all messages up to and including the specified sequence number within the session. This header, can appear in both client and sever messages.

Correlation ID 183 can be used to associate a message with a prior message. For example, a correlation ID can associate a response message with the related request message. The sequence numbers provide a protocol reliability model. The correlation id is a number prefixed with "c" or "s" denoting the direction of the referenced message; "c" indicating that the reference message originated from the client; and "s" indicating that the reference message originated from the server.

The sequence number along with acknowledgement sequence numbers, error messages and retransmission ensure that messages are reliably exchanged between HTML5 applications and the WSC (or HTML5 endpoints). The acknowledgement messages and error messages are applicable to requests, responses and messages. An acknowledgement message can be identified by the "message acknowledgement" control type in the control headers section. It is an acknowledgement that a message and all the messages with a lower sequence number have been successfully delivered. In an embodiment of the invention, the protocol allows an HTML5 application to be configured to send an acknowledgement message for every message. If one side receives an acknowledgement message with a sequence number higher than that of a particular sent message, and does not receive an error message for the particular message, it can be assumed that the particular message has been successfully delivered. In an embodiment of the invention, an error message indicates that a message with the specified sequence number has encountered an error.

The protocol utilizes a WebSocket connection and retransmissions of messages are not required, except when the connections are broken and need to be re-synched. The connection recovery can follow the semantics explained in the MBWS specification. The protocol also depends on the WebSocket ping/pong to support keepalive, and the failure of one side to receive the keepalive would result in timeout of the last request/response/message. In a scenario where the WebSocket ping/pong is not supported by the browser, the client-side controller can initiate a custom ping/pong with the WSC. When the browser/client-side controller determines that it is not receiving pong from the server any more, it continues to send the ping messages for a stipulated period of time at intervals which double at each attempt.

The general headers section 174 contains information related to the specific action involved in the message. For example, for a START request, the general headers section can identify who has initiated the request, for whom the request is intended etc. In an embodiment of the invention, the general headers 174 include the following fields: action 188, an initiator 185, a target 186, error code 184, and message notification header 187. Note that, as previously described, the protocol permits for the creation of one or additional extension headers to implement new functionality (shown in FIG. 1C as extension headers 189, 189*a*, 189*b*). The fields comprise attribute-value pairs information related to the semantics of the protocol. An HTML5 application can also add additional headers to this section in the form of additional AVPs (attribute-value pairs). Such additional AVPs may be mapped by a gateway server, e.g., WSC, to a SIP header or a parameter. TABLE II shows the general headers 174 of the protocol.

TABLE II

| Attribute | Value | Function |
| --- | --- | --- |
| Action (a) | | This is the action which the message is used for. |
| Action (a) | CONNECT | Establishes a protocol level session with the server. |
| Action (a) | START | Message that start a session with a particular package. |
| Action (a) | COMPLETE | Informs the completion of media establishment. |
| Action (a) | NOTIFY | Equivalent to Notification of Notification Server. |
| Action (a) | SHUTDOWN | Shutdown a session started by a particular request message. |
| Initiator (i) | alice@example.com | Optional. Identifies the user who initiated a request. Note that, while it is possible for the client to set this value, it is also possible that this value may come from the HTTP session. In certain cases, such a value may not even exist (e.g.: a random user clicking on the web page to talk with customer care). |
| Target (t) | | Optional: Again, this may be obtained from HTTP session. |
| error_code (ec) | | Optional: This is the error code of the message, only apply to error type message. |
| CONNECT, cslr (cslr) | | Optional: This header is used when a CONNECT message is sent with an existing session_id to re-establish the session. The value of this header will be the sequence number of the last received message at the client. |
| CONNECT, cslw (cslw) | | Optional: This header is used when a CONNECT message is sent with an existing session_id to re-establish the session. The value of this header will be the lower bound of the messages in the client's retained window. |
| CONNECT, csuw (csuw) | | Optional: This header is used when a CONNECT message is sent with an existing session_id to re-establish the session. The value of this header will be the upper bound of the messages in the client's retained window. |
| CONNECT, sslr (sslr) | | Optional: This header is used when a CONNECT message is sent with an existing session_id to re-establish the session. It is the sequence number of the message the server last received. |
| message-notification, expiry (xp) | | Optional: This header represents expiry time of the subscription for receiving message-summary notifications. |

The action field 188 indicates an action which the message is used for. For example, the action CONNECT establishes a protocol level session with the server; the action START indicates that the message is used for starting a session with a particular package. The optional initiator 185 indicates the user, e.g., alice@example.com, who initiated a request. In an embodiment of the invention, while the client can set this value, this value may come from the HTTP session. In certain cases, such a value may not even exist. For example, when a random user clicks on the web page to talk with a customer service representative. The optional target field 186 can be used to indicate a remote peer. The optional error code field 184 can be used to transmit an error code.

A client requests a connection reconnect by sending a Connect frame containing the session_id of the connection to be reconnected followed by a list of three message sequence numbers. The first sequence number (CSLR) is that of the last message the client has received. The second (CSLW) and third (CSUW) sequence numbers define the respective lower and upper bounds of the sequence numbers of the messages in the client's retained message window. Upon receipt of this Connect frame, the server determines if it can reconnect based on the following criteria: The session_id must match the client's current session_id; CSLR+1 must be the sequence number of a message the server can reinitiate sending with (i.e. either the message with this sequence number is in the connection's retained message window or it is the sequence number of the next unsent message); and the message sequence number of the message the server last received (SSLR) is in the range of CSLW−1 to CSUW. If all three criteria are met the reconnect succeeds and the server responds with a Connect frame containing the reconnected session_id and one sequence number (SSLR) which is that of the last message received by the server. Message transport then resumes with the client sending the SSLR+1 message and the server sending the CSLR+1 message. If the criteria are not met, the reconnect request fails and the server treats it as though it were a connect request and responds with a connect response. The client recognizes that its reconnect request has been converted into a connect request because the response contains a session_id that does not match the session_id in the client's reconnect request.

In an embodiment of the invention, the general headers section 174 can include more optional fields, such as action specific fields and package specific fields. An example of an action specific field can be a field used when a CONNECT message is sent with an existing session ID to re-establish the session. The value of this field can be the sequence number of the last received message at the client. An example of the package specific headers can be a header that represents expiry time of the subscription for message-summary notifications.

In an embodiment of the invention, an example a message in protocol 106 can be as follows:

```
START
{
    "control": {
    "type":"request",
    "message-state":"initial"
    },
    "header": {
    "message-type":"start",
    "initator":"bob@example.com",
    "target":"alice@example.com",
    },
    "payload": {
    "<offer-sdp>"
    }
}
```

The WSC can provide the ability to extend the protocol by adding depth and applicability to a set of existing methods. New headers, e.g., security header and capabilities header, can be added to the control headers section and the general headers section of a message. New control types and message types can also be added, e.g., UPDATE, and the protocol extensions shall follow the semantics of the core protocol (control and general headers).

In order to facilitate extensibility, JSON templates can be provided to facilitate the protocol extension. For example, JSON templates can allow a client to program towards abstract data and service models rather than directly to JSON specified structure/definitions. In an embodiment of the invention, templates can be provided for message-types (CONNECT, START, NOTIFY) and create a new message-type by providing a message name and the required header parameters in the templates. The template can create a new message-type based on the parameters passed. The templates may be provided, for example, by the WSC.

FIG. 1D is a flowchart of a method of extending the JavaScript API 103 by creating a complete new custom JSONrtc message within the scope of an existing package according to an embodiment of the invention. At Step 191, an INFO message is created to be sent as part of an ongoing call. The message conforms to the JSONrtc protocol and has a control headers block, a general headers block and a payload block. At Step 192, the CallPackage and Call can be extended using an extending mechanism provided by the JavaScript API 103. For example, a CallPackageExtension package can be created as a child object of the CallPackage, and a CallExtension object can be created as a child object of the Call object. The constructor of the child object calls the constructor of the parent so that the objects initialized in the parent's constructor code is available to the child and some code related to the parent can be overwritten to meet the needs of the new objects. For example, the code related to the Call object in the CallPackage can be overwritten so that the CallExtension object is created, instead of the default Call object.

At Step 193, a session can be created between the client and a WSC 102. The CallExtensionPackage can be registered as handler with the session, create a subsession for a call, and create a second subsession for sending INFO messages as part of the ongoing call. At Step 194, subsessions can be created between the client and WSC 102 for the Call Messages and INFO messages within the session. At step 195, messages are received that are associated with CallExtensionPackage. At step 196 the Session function will detect any messages related to the CallExtensionPackage and delegate the messages to the CallExtensionPackage hander, which further invoke the CallExtension to process the messages. If the messages are INFO messages, process them using the CallExtension object; if they are Call messages, delegate the handling to the base class (the Call object).

Further details of one possible implementation of the system and method of the present invention 100 are described below with respect to FIGS. 2A-2D, in which Client side controller 104 is implemented as RTC Client Signaling Controller 222, and protocol 106 is implemented in JavaScript Object Notation (JSON).

Figure 2A:
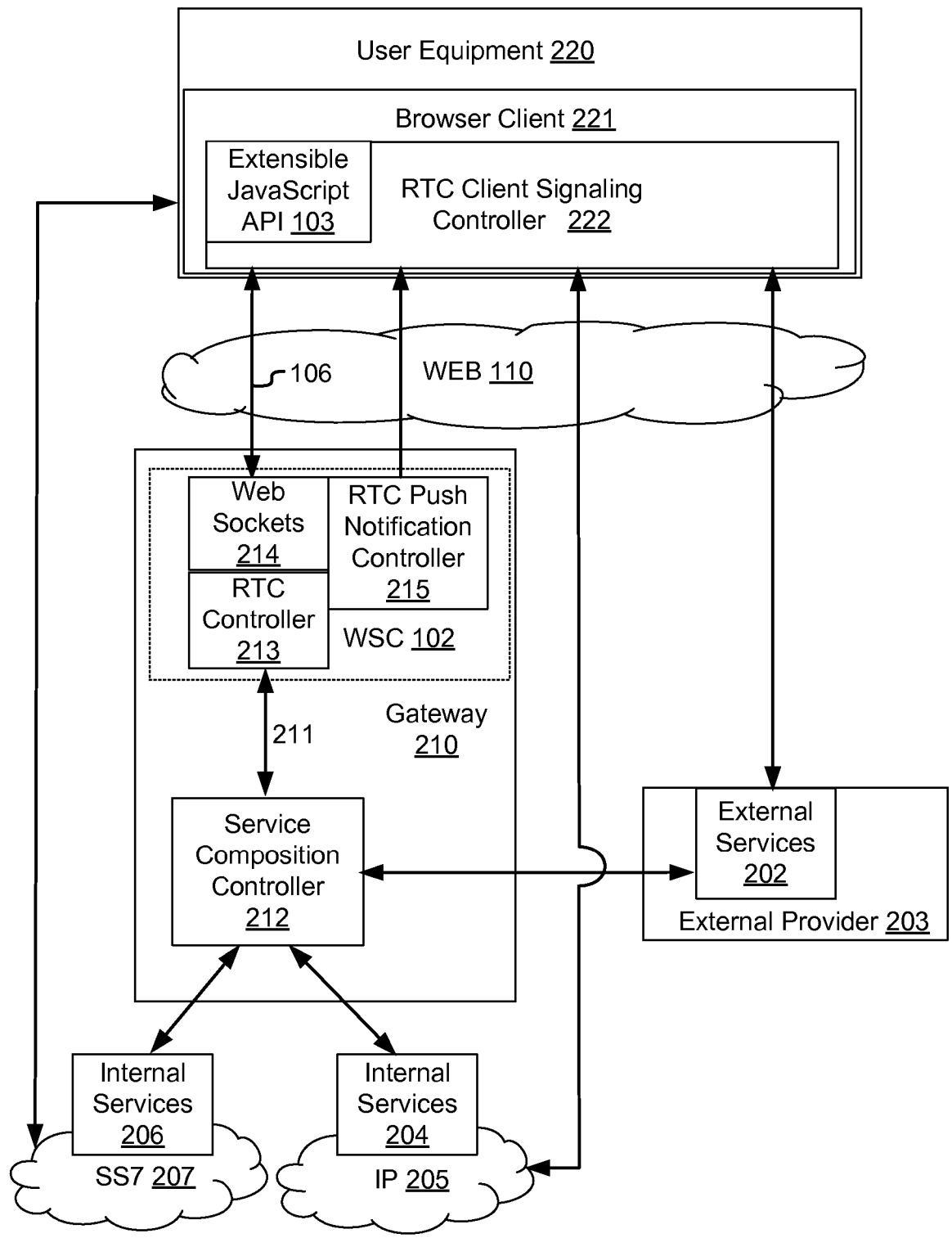
FIG. 2A shows a system for real-time communication signaling according to an embodiment of the present invention.

FIG. 2A shows a gateway 210 for real-time communication signaling according to an embodiment of the present invention. As shown in FIG. 2A, Gateway 210 includes RTC Controller 213, RTC Push Notification Controller 215, and Service Composition Controller 212. RTC Controller 213 and RTC Push Notification Controller 215 interact with RTC Client Signaling Controller 222 over the Web 110. RTC Controller 213 communicates internally 211 using SIP with Service Composition Controller 212. Service Composition Controller 212 mediates provision of Internal Services 206, 204 and External Services 202 of an External Provider 203. RTC Push Notification Controller 215, RTC Controller 213 and WebSocket Interface 214 together comprise an embodiment of a WebRTC Session Controller (WSC 102).

RTC Controller 213 provides scalable signaling over HTTP Web-centric protocols for communicating over Web 110 with RTC Client Signaling Controller 222. RTC Controller 213 communicates with RTC Client Signaling Controller 222 via WebSocket interface 214. RTC Controller 213 provides a highly available, encapsulated front end interface to the Web developer. The RTC Controller 213 terminates the Internet domain communications with the client-side by managing the WebSocket connections. The RTC Controller 213 also parses and processes the Internet domain communications. The RTC Controller 213 normalizes the Internet domain communications into an internal SIP for communication within Gateway 210. Thus, RTC Controller 213 communicates internally with Service Composition Controller 212 using a binary SIP.

Service Composition Controller 212 provides for service composition and orchestration across domains and different providers. The Service Composition Controller 212 also provides a unified layer to inject charging and policy control for differentiated service offerings. In an embodiment the functionality of Service Composition Controller 212 can be integrated into a converged application server, for example Oracle™ Communications Converged Application Server (OCCAS). Alternatively, the functionality of Service Composition Controller 212 can be integrated into a service controller, for example Oracle™ Communications Service Controller (OCSC).

Service Composition Controller 212 adopts and reuses existing internal communication services with support for different signaling protocols. Thus, for example, Service Composition Controller 212 can mediate: Internal Services 206 providing network telephony signaling using the SS7 protocol 207; and Internal Services 204 providing services using internet protocol 205.

Service Composition Controller 212 can also mediate the provision of external services 202 provided by an external service provider 203. Communication with external provider 203 can be conducted using a selected signaling protocol SIP, XMPP etc as required by the external provider 203. Services provided by external provider 203 can include web services provided over Web 110 to a browser client 221 on user equipment 220. Service Composition Controller 212 thus enables external providers of over-the-top ("OTT") services to provide OTT services to users/clients. The gateway system enables the external providers to make use of the real-time communication signaling over IMS. The users/clients can then access web applications provided by external providers from a browser on the user equipment.

The gateway system acts as the IMS proxy for both HTML5 and external providers by taking advantage of WebSocket technology, to enable and expedite the IMS deployment. The WebSocket Protocol defines a mechanism for fast, secure, two-way communication between a client and a server over the Web. Data is transferred over a full-duplex single socket connection, allowing messages to be sent and received from both endpoints in real-time. To establish a WebSocket connection, a specific, HTTP-based handshake is exchanged between the client and the server. If successful, the application-layer protocol is "upgraded" from HTTP to WebSocket, using the previously established TCP transport layer connection. After the handshake, HTTP is no longer used and data can be sent or received using the WebSocket protocol by both endpoints until the WebSocket connection is closed.

RTC Client Signaling Controller 222 is resident on user equipment 220 and manages multiplexing of signaling request/response for all client-side applications mediating communication with RTC Controller 213 over HTTP web-centric protocols. The particular HTTP protocol used can be defined as required by the particular native or external service, for example, JSON, XML, XMPP, Skype protocol etc. A client-side library of available protocols is provided as part of an SDK in order to extend the services to the client. In a preferred embodiment a JSONrtc protocol is utilized and RTC Client Signaling Controller 222 includes a JavaScript API 103 which encapsulates the signaling layer to facilitate implementation by applications running in web applications running on User Equipment 220.

For telephony applications low power consumption by user equipment 220 is desirable. Accordingly RTC Client Signaling Controller 222 can be placed in standby operation when not involved in signaling. Moreover WebSocket protocol must be initiated from the client-side and is also responsible for keeping the connection alive. Thus, the RTC Client Signaling Controller 222 will shut down the WebSocket Connection when there is no traffic. In an embodiment of the invention, RTC Push Notification Controller 215 can be used by RTC Controller 213 to "wake-up" RTC Client Signaling Controller 222 from the standby state in order to resume communication. The RTC Push Notification Controller 215 may, in some embodiments, also be used for other notifications such as call notifications, message notifications, and the like. In an alternative embodiment, the keepalive and pingpong capabilities of the WebSocket protocol may be used to maintain WebSocket connection without requiring a separate RTC Push Notification Controller 215.

In an embodiment of the invention, RTC Push Notification Controller 215 includes a server-side HTTP connection based Push Notification to wake up the client-side signaling process. RTC Client Signaling Controller 222 can utilize any push notification mechanism and protocol effective for user equipment 220. For example, RTC Push Notification Controller 215 can utilize the SMS message system to activate RTC Client Signaling Controller 222, thereby causing RTC Client Signaling Controller 222 to reactivate the WebSocket connection with the RTC Controller 213.

Figure 2B:
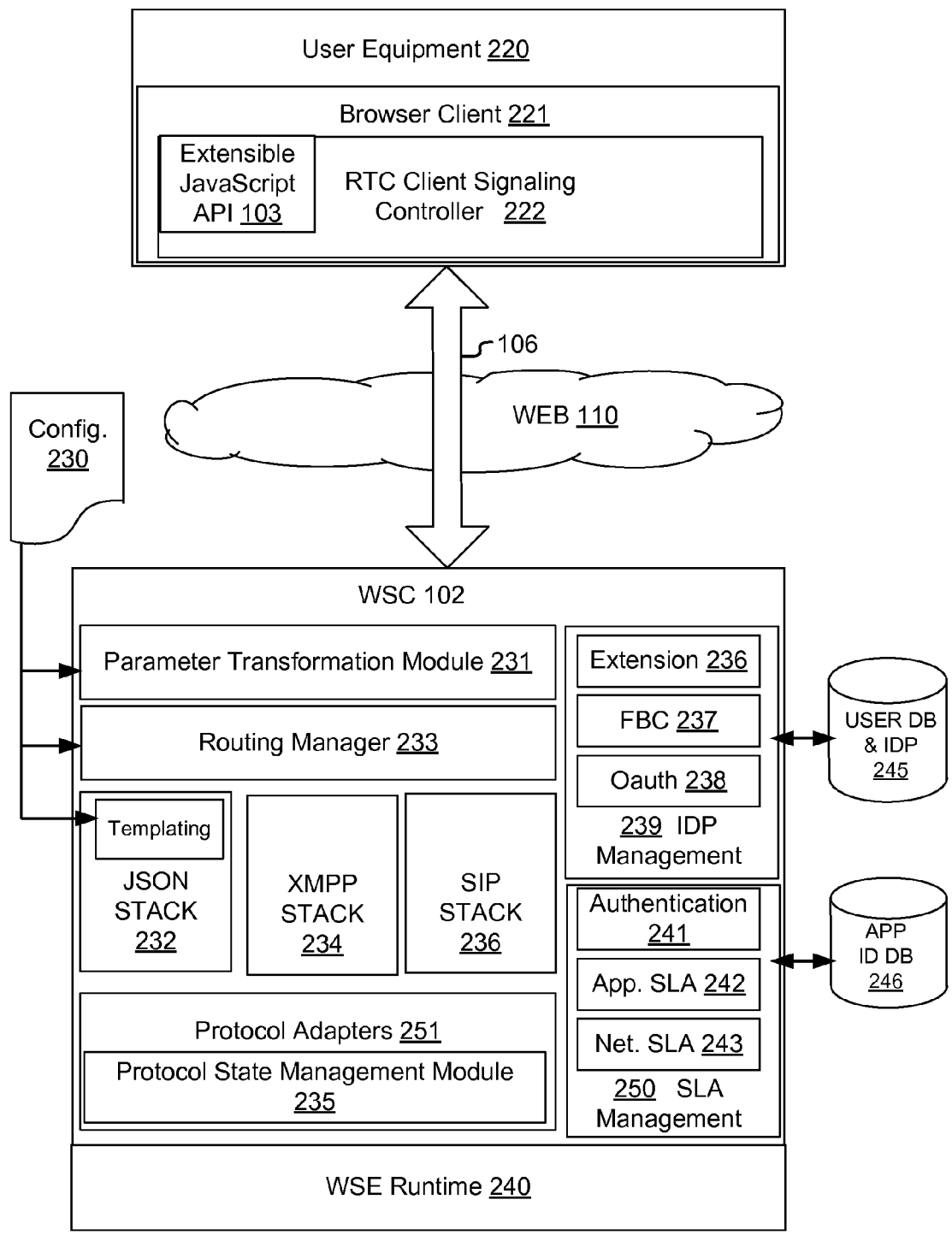
FIG. 2B shows a server-side WebRTC Session Controller according to an embodiment of the invention.

FIG. 2B shows an example of a WebRTC Session Controller (WSC) 102 according to an embodiment of the invention. WSC 102 is deployed between the browser client 221 and the service composition controller 212 for exposing the internal and external services 206, 204, 202 to the client browser 221 (see FIG. 2A). WSC 102 enables the browser as a client for the network services and hence acts as a browser adapter. WSC 102 enables browser client management and ensures reliability of the service end to end (browser to network). WSC 102 provides a number of features to the carriers and enterprise customers as described below.

WSC 102 including a WSC runtime module 240 supports multiple signaling protocols and ensures correct mapping of the signaling message using parameter transformation module 231 and correct routing of the messages based on routing profiles using routing manager 233. Parameter transformation, routing and JSON templating are all configurable using a configuration file 230.

WSC 102 performs protocol mapping between the selected client-side protocol and the network side protocol (SIP). For example, WSC is adapted to receive a JSON message, parse the SDP information and map it to other supported protocols (SIP/XMPP). WSC 102 maintains a data definition for the format to parse to. When the JSON request is received at WSC 102, the transformation between the data definition and the JSON message structure must be implemented.

WSC 102 acts as a cross protocol signaling engine. WSC 102 handles the protocol associated state as demanded by the protocol. When WSC 102 is acting as a cross-protocol gateway, for example, JSON/WebSocket to SIP, the SIP side of WSC 102 maintains the transaction and dialog state. WSC 102 includes a protocol state management module 235 which manages the protocol state and ensures state replication for reliability of message exchange. WSC 102 has the ability to manage enormous amounts of concurrent client connections in order to be able to scale to the applications and users on the Web.

For developers, the key is to leverage existing knowledge and skill sets to minimize additional time and resources required by security features implementation. WSC 102 comes with APIs that support multiple platforms running under multiple protocols and a set of client libraries to facilitate smooth development process. WSC 102, thus, additionally provides an extensibility framework to extend the capabilities via protocol adaptors 251 and APIs for the Web developers to call the WSC functions from their applications.

WSC 102 provides signaling adaption such that WSC 102 handles all the signaling between the browser client 221 and the network end point (SIP Proxy, PSTN Gateway for example). WSC 102 is adapted to handle the message exchange using several protocols over WebSocket (RFC 6455) including, for example: JSON based protocol via JSON Stack 232; XMPP sub-protocol via XMPP Stack 234; SIP sub via SIP Stack 236; BOSH (XEP-0124); and COMET (Bayeux protocol) (not shown). On the network/carrier side the WSC supports translation into a suitable communication protocol or protocols (e.g. XMPP, SIP and the like). Thus, for example, on the network/carrier side, WSC 102 supports SIP (RFC 3261).

Security for real-time communication over the Web requires that the communicating endpoints be able to authenticate each other. While these end points are making calls through the signaling services, their identities are authenticated via an Identity Provider Management Module (IDP) 239 that supports OAuth 238, Facebook Connect (FBC) 237 and other Identity Protocols using extensions 236 (e.g. OpenID connect). IDP Management modules 239 interact with internal and/or external user database and identity servers 245.

WSC 102 thereby acts as an identity service that can attest the identity of the caller of the received request and map it to the "from" identity of the outbound call. For example, WSC 102 includes OAUTH module 238 which introduces security functions that authenticate and authorize the browser-based applications to interact with the network services. WSC 102 thereby provides service providers with the ability to control any third party partner's access and usage of its network capabilities.

Establishing real-time communication over the Web also utilizes verification of service level agreements (SLA) for the user and application. SLA Management module 250 includes an authentication module 241, as well as an application SLA module 242 and network SLA module 243 which communicate with internal and/or external databases 246 to verify that the communications are provided in conformance with the relevant service level agreements for the user and application.

In a particular embodiment, WSC 102 defines a JavaScript Object Notation (JSON) protocol that is used for exchanging information and to control the set up of media between a browser client 221 and WSC 102. JSON is a lightweight data-interchange format; however other data-interchange formats may be used in alternative embodiments. The JSON protocol can be used on multiple transports (COMET, BOSH, and WebSocket). When used on WebSocket transport, the protocol is defined as a sub-protocol of the WebSocket protocol.

The JSON protocol (or alternative data-interchange format) defines the basic structure for the information transfer between the browser client 221 and WSC 102. The JSON protocol defines the minimum set of messages and state machinery necessary to implement the offer/answer model.

The JSON protocol defines the message structure that accounts for the reliability (reconnect, retransmissions, timeouts etc) of the message. The JSON protocol also handles the necessary headers to function in multilevel secure environment (security headers).

WSC 102 also provides an internal routing manager 233 for the routing of the requests to the appropriate end nodes based on variety of parameters. There are multiple WSC instances (see FIG. 2C) and each instance is connected to the network node serving the functionality. The incoming requests (JSON messages, for example) have to be routed to the right application and instance. WSC 102 uses routing manger 233 to route incoming requests based on their origination and destination. WSC 102 provides functionality including performing look-ups and route requests for JSON to SIP, JSON to XMPP, SIP to XMPP, XMPP to SIP. Each route in the WSC routing manager 233 has a routing profile. WSC 102 provides a default routing profile and additional routing profiles are configurable as needed or desired.

Figure 2C:
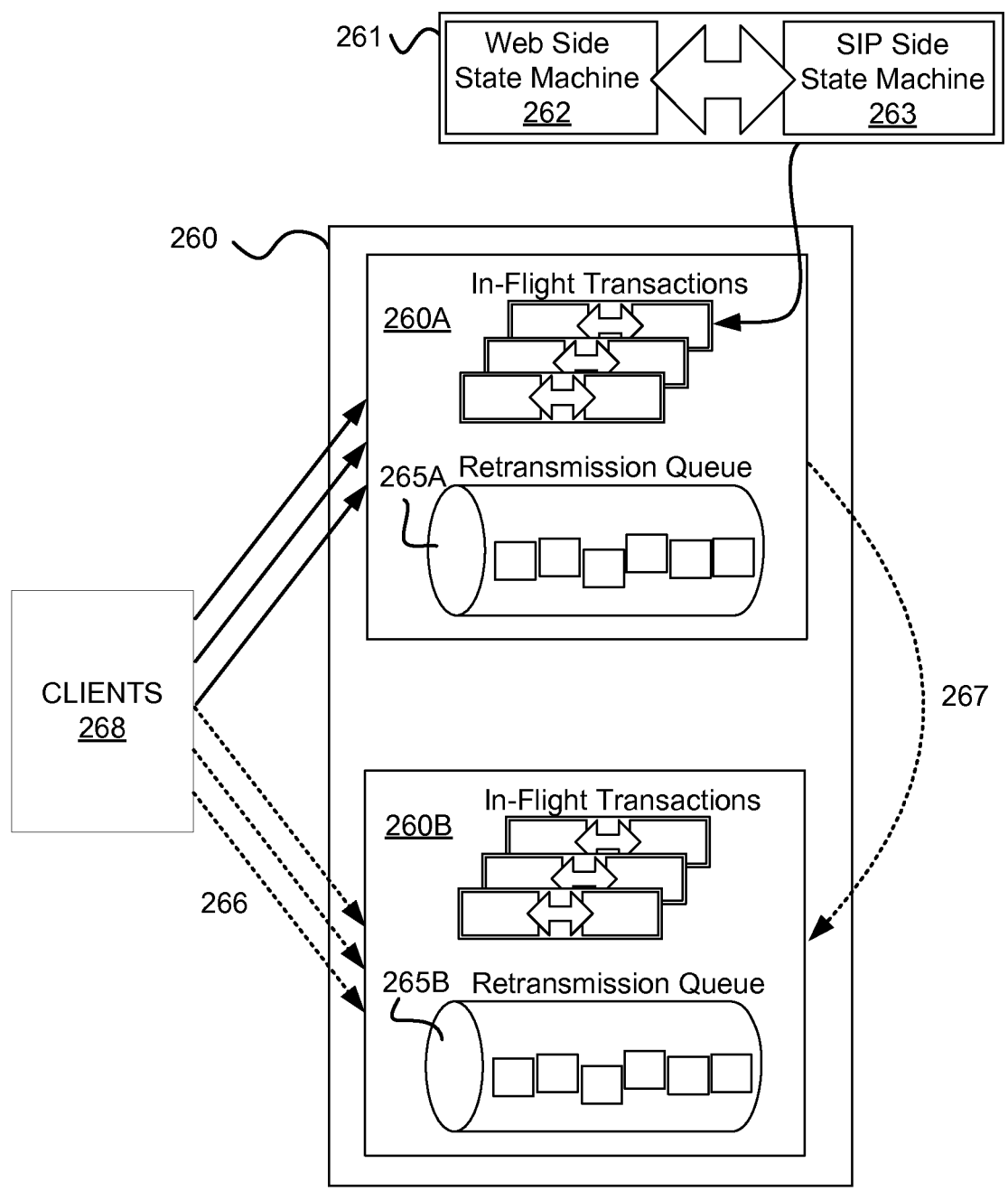
FIG. 2C shows an aspect of the server-side WebRTC Session Controller of FIG. 2B according to an embodiment of the invention.

FIG. 2C shows an aspect of WSC 102 of FIG. 2B according to an embodiment of the invention. WSC 102 maintains session control information, protocol state, dialog state, transaction state. WSC 102 provides for state maintenance and session state mapping across protocols. WSC 102 also enables hooks into the media session state. WSC 102 also maintains the SDP Agent information. WSC 102 operates to ensure reliable message exchange with clients 268.

WSC 102 ensures reconnection of clients due to failover or loss of connectivity. Clients and servers use an implicit sequence numbering protocol for the message transported by the connection. Clients and the servers each maintain their own sequence number. Both client and server acknowledge their receipt of messages by sending acknowledgement ("ack") messages. As per the protocol, an ack message indicates that the message has reached the destination (as well as all the messages lower than that sequence). Similarly an error message shall be defined (as in the JSON protocol section) to indicate that the message with a sequence number has met with an error. Retransmission Queue 265A, 265B allows for retransmission of messages for which there is an error or lack of acknowledgement.

One way in which WSC 102 maintains reliability is to keep the relevant conversation state redundant across different servers 260A, 260B having instances of WSC 102. WSC 102 provides for state maintenance and session state mapping across protocols. The relevant conversation state includes a Web Side State Machine 262 and SIP Side State Machine 263 for each In-Flight Transaction 261. WSC 102 maintains the session states (both client and server side state) in the cache. In order to ensure reliability, the cached copy of the state machines is duplicated on several servers. Additionally retransmission queue 265A, 265B is duplicated across servers 260A, 260B. WSC 102 uses coherence for state storage and management. If a server, for example server 260A cannot be contacted due to a network failure WSC 102 ensures that the state is retrieved from another active server 260B as shown by the dashed arrows 267, 266.

Figure 2D:
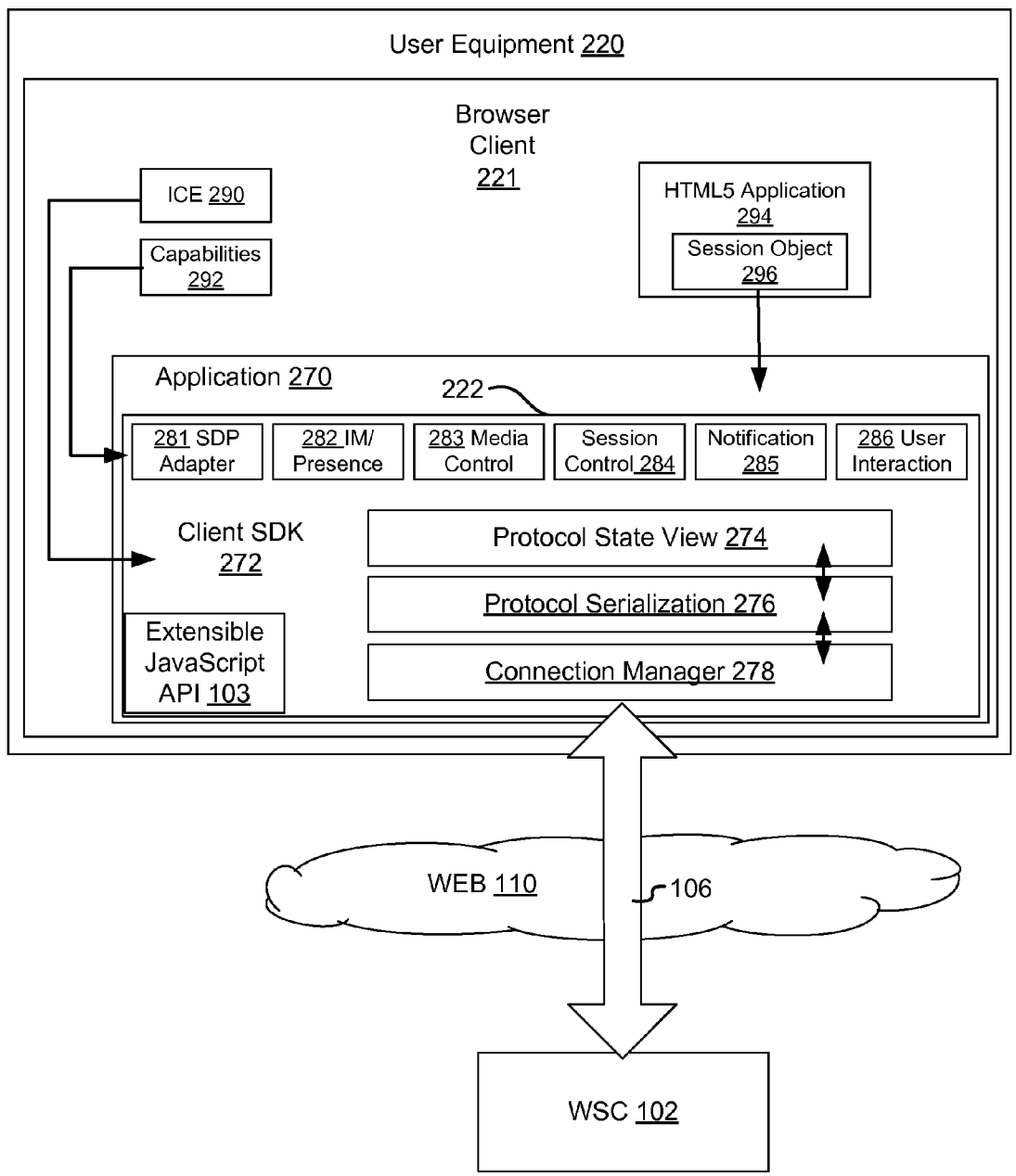
FIG. 2D shows a client-side RTC signaling controller according to an embodiment of the invention.

FIG. 2D shows an implementation of a client-side RTC signaling controller 222 as shown in FIG. 2A according to an embodiment of the invention. In an embodiment client-side RTC signaling controller 222 is implemented as part of an application 270 running on a browser client 221 (for example a JSS/CSS/HTML5 application). Application 270 is resident on user equipment 220 such that RTC signaling controller 222 manages multiplexing of signaling request/response for all client-side applications mediating communication with WSC 102 (see FIGS. 2A and 2B). Application 270 includes SDP Adapter 281, IM/presence module 282, media control module 283, Session Control 284, notification module 285, and user interaction module 286.

In an embodiment application 270 is a JavaScript Application. Application 270 operates at a high level without having to deal with peer connection directly. The browser client 221 is stateless and contains as little of the implementation of the transport establishment code as possible. Browser client 221 identifies the capabilities 292 of the browser client 221 and user equipment 220 for streaming media. The capabilities 292 are provided to the SDP adapter 281 of the application 270. SDP adapter 281 provides a description of streaming media initialization parameters—a session profile—suitable for streaming media to the browser client 221 running on user equipment 220.

A client-side library of available protocols is provided as part of a Client SDK 272 in order to extend the services to the browser client 221. The particular HTTP protocol used can be defined as required by the particular native or external service, for example, JSON, XML, XMPP, Skype protocol etc. In a preferred embodiment a JSON protocol is used for communication between client-side RTC signaling controller 222 and WSC 102 as described above.

Protocol serialization 276 interacts with protocol state view 274 and connection manger 278 to communicate with WSC 102 over Web 110. Session Control 284 establishes reliable connection with WSC 102. This session can be used by the application 270 to create or invoke other objects.

RTC signaling controller 222 comprises a JavaScript SDK 272 which provides the functions necessary for application 270 to manage server connections (connection establishment, teardown via WebSocket). The JavaScript SDK 272 provides functions necessary to handle the state machine and functions to deal with interoperability issues. For example, the JavaScript SDK 272 of application 270 provides functions to create messages or insert messages into the state machine. The JavaScript SDK 272 also provides functions for the client to monitor connection health, including the ability to reconnect in case of stale connections and the ability to synchronize state from the server and add modified state back to the server.

JavaScript SDK 272 also provides a JavaScript API 103 which can modify and optimize media parameters, session description protocol (SDP), etc. The JavaScript API 103 abstracts out complex functionality and provides an application programming interface to deal with the real-time communication session, Call etc. The JavaScript API 103 provides the ability to handle call states, media states, subscriptions and notifications.

In operation, HTML5 applications 294 access the JavaScript API 103 to get access to various communication objects defined in the JavaScript API 103 and described above. An HTML5 application 294 will create a session object 296. The session object 296 acts as browser side representation of the communication. From session object 296, application 270 can create different communication objects like Call, Subscription etc. The HTML5 application can listen on the callbacks from the objects to receive incoming calls, notifications, media in the call, state changes etc.

The Interactive Connectivity Establishment (ICE) draft, developed by the IETF's MMUSIC working group, provides a framework to unify the various NAT traversal techniques. ICE defines a standardized method for clients to determine what type of firewall(s) exist between clients and determine a set of IP addresses by which clients can establish contact. When an ICE-enabled client (the initiator) wishes to communicate with another device (the responder), it first collects information on addresses where the client can receive IP traffic. A key benefit that ICE provides is the ability to unify the information provided by these various sources of IP address information to create as many paths as possible by which the endpoints can be reached.

For real-time communication over the Web, the ICE state machine 290 is maintained by the browser client 221. When the browser client 221 reloads, the application 270 has no knowledge of the ICE Candidates and is forced to perform ICE restart. In order to avoid this, application 270 can save this information in WSC 102. When the initial ICE negotiation finishes, the browser client 221 sends the nominated ICE candidate pair of IP addresses to the application 270 which saves this information in WSC 102. When the browser client 221 reloads, the application 270 will fetch the nominated ICE candidate information from the server, and then send it to the browser client 221. This will tell the browser client 221 to use these candidates for media transfer. Since the browser client 221 has kept the local nominated ICE candidate alive all the time, as long as the remote side has not released the call, the transfer will succeed.

Although the invention has been described above with respect to communication services in a telecommunications network, the invention also finds application in any situation where it is necessary or desirable to provide real-time communication signaling.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for enabling real-time communication between an HTML5 application and a server-side real-time communication signaling controller, the system comprising:
    a computer including one or more microprocessors;
    a client-side controller operating on the computer, wherein the client-side controller provides a JavaScript application programming interface (API) to interface with the HTML5 application and to facilitate communication between the HTML5 application and the server-side real-time communication signaling controller;
    wherein the JavaScript API includes a plurality of libraries for use by the HTML5 application in adding functionalities thereto;
    wherein the functionalities are used by the HTML5 application to communicate with the server-side real-time communication signaling controller, and are added using one or more elements selected from the group consisting of
        an extension header of a message transmitted between the HTML5 application and the server-side real-time communication signaling controller,
        a new JavaScript package created by extending an existing package in the JavaScript API, and
        a new object created by extending an existing JavaScript object in the JavaScript API.

2. The system of claim 1, wherein the newly created JavaScript package registers itself as a package handler with a session layer created between the HTML5 application and said server-side real-time communication signaling controller.

3. The system of claim 2, wherein the package handler is identifiable by a package identifier, and handles messages that contains the package identifier.

4. The system of claim 1, wherein the newly created JavaScript object contains logic to determine whether to delegate handling of messages to the existing object based on types of the messages.

5. The system of claim 1, wherein the extension header includes customized information that is passed in by the HTML5 application.

6. The system of claim 5, wherein the customized information is passed to the extension header as a last parameter of a method in said HTML5 application.

7. The system of claim 6, wherein said server-side real-time communication signaling controller contains logic to process the customized information.

8. A method for enabling real-time communication between an HTML5 application and a server-side real-time communication signaling controller, the method comprising:
    providing a client-side real-time communication signaling controller operating on one or more microprocessors, wherein the client-side real-time communication signaling controller provides a JavaScript application programming interface (API) to interface with the HTML5 application and to facilitate communication between the HTML5 application and the server-side real-time communication signaling controller, wherein the JavaScript API includes a plurality of libraries for use by the HTML5 application in adding functionalities thereto;
    invoking the JavaScript API to add functionalities to the HTML5 application using one or more elements selected from the group consisting of an extension header of a message transmitted between the HTML5 application and the server-side real-time communication signaling controller, a new JavaScript package created by extending an existing package in the JavaScript API, and a new object created by extending an existing JavaScript object in the JavaScript API; and using the added functionalities to communicate with the server-side real-time communication signaling controller.

9. The method of claim 8, wherein the newly created JavaScript package registers itself as a package handler with a session layer created between the HTML5 application and said server-side real-time communication signaling controller.

10. The method of claim 9, wherein the package handler is identifiable by a package identifier, and handles messages that contains the package identifier.

11. The method of claim 8, wherein the newly created JavaScript object contains logic to determine whether to delegate handling of messages to the existing object based on types of the messages.

12. The method of claim 8, wherein the extension header includes customized information that is passed in by the HTML5 application.

13. The method of claim 12, wherein the customized information is passed to the extension header as a last parameter of a method in said HTML5 application.

14. The method of claim 13, wherein said server-side real-time communication signaling controller contains logic to process the customized information.

15. A non-transitory computer-readable storage medium storing a set of instructions for real-time communication, said instructions, when executed by one or more processors, causing the one or more processors to perform steps comprising:

providing a client-side real-time communication signaling controller operating on one or more microprocessors, wherein the client-side real-time communication signaling controller provides a JavaScript application programming interface (API) to interface with an HTML5 application and to facilitate communication between the HTML5 application and a server-side real-time communication signaling controller, wherein the JavaScript API includes a plurality of libraries for use by the HTML5 application in adding functionalities thereto;

invoking the JavaScript API to add functionalities to the HTML5 application using one or more elements selected from the group consisting of an extension header of a message transmitted between the HTML5 application and the server-side real-time communication signaling controller, a new JavaScript package created by extending an existing package in the JavaScript API, and a new object created by extending an existing JavaScript object in the JavaScript API; and using the added functionalities to communicate with the server-side real-time communication signaling controller.

16. The non-transitory computer-readable storage medium of claim 15, the newly created JavaScript package registers itself as a package handler with a session layer created between the HTML5 application and said server-side real-time communication signaling controller.

17. The non-transitory computer-readable storage medium of claim 16, wherein the package handler is identifiable by a package identifier, and handles messages that contains the package identifier.

18. The non-transitory computer-readable storage medium of claim 15, wherein the created JavaScript object contains logic to determine whether to delegate handling of messages to the existing object based on types of the messages.

19. The non-transitory computer-readable storage medium of claim 15, wherein the extension header includes customized information that is passed in by the HTML5 application.

20. The non-transitory computer-readable storage medium of claim 19, wherein the customized information is passed to the extension header as a last parameter of a method in said HTML5 application.

* * * * *